US012550897B2

(12) United States Patent
Clemens et al.

(10) Patent No.: US 12,550,897 B2
(45) Date of Patent: Feb. 17, 2026

(54) POST-HARVEST FUNGICIDAL USES

(71) Applicant: SYNGENTA CROP PROTECTION AG, Basel (CH)

(72) Inventors: Christopher Glen Clemens, Richland, WA (US); Nagarajan Ramalingam, Greensboro, NC (US); Heather Sabina Benik, Visalia, CA (US)

(73) Assignee: SYNGENTA CROP PROTECTION AG, Basel (CH)

( * ) Notice: Subject to any disclaimer, the term of this patent is extended or adjusted under 35 U.S.C. 154(b) by 0 days.

(21) Appl. No.: 17/539,771

(22) Filed: Dec. 1, 2021

(65) Prior Publication Data

US 2022/0087261 A1 Mar. 24, 2022

(51) Int. Cl.
*A01N 43/54* (2006.01)
*A01N 43/36* (2006.01)

(52) U.S. Cl.
CPC ............ *A01N 43/54* (2013.01); *A01N 43/36* (2013.01)

(58) Field of Classification Search
CPC ..................................... A01N 43/54
See application file for complete search history.

(56) References Cited

U.S. PATENT DOCUMENTS

| 9,468,210 | B2 * | 10/2016 | Ramalingam ............ A23B 7/16 |
| 2008/0280929 | A1 † | 11/2008 | Alexander et al. |
| 2016/0150781 | A1 † | 6/2016 | Nagarajan et al. |

FOREIGN PATENT DOCUMENTS

| CN | 104430364 A | 3/2015 |
| CN | 108633885 A | 10/2018 |
| WO | 03045147 A1 | 6/2003 |
| WO | 2008110274 A2 | 9/2008 |
| WO | 2014204822 A1 | 12/2014 |
| WO | 2017004350 A1 | 1/2017 |

OTHER PUBLICATIONS

EPA Document (Year: 2021).*
EPA Document (Year: 2020).*
Peters et al. (Characterization of *fusarium* spp. responsible for causing dry rot of potato in Great Britain, Plant Pathology, 2008). (Year: 2008).*
United States Environmental Protection Agency Decision Number 521182 dated Jan. 9, 2017 related to "Label Amendment—Removing non-mandatory restriction on seed pieces; other minor revisions" for Stadium Fungicide (EPA Registration No. 100-1453, Application Date: Sep. 2, 2016).
United States Environmental Protection Agency Decision Number 558530 dated Jan. 17, 2020 related to "Label Amendment—Adding the maximum number of applications, and revisions to product name, typos, spelling, grammar, formatting throughout the label, etc" for Dexter SC Fungicide (EPA Registration No. 70506-351, Application Date: Nov. 20, 2019).
United States Environmental Protection Agency Notice of Pesticide Registration for Decco Fludi SC (EPA Registration No. 2792-84, Issuance Date: Apr. 27, 2020).
United States Environmental Protection Agency Decision Number 578648 dated Oct. 26, 2021 related to "Label Amendment—Add Potato, Tuberous and Corm Vegetables Subgroup 1C; Reduce maximum application rate on citrus" for Graduate A+ (EPA Registration No. 100-1308, Application Date: Jul. 20, 2021).
United States Environmental Protection Agency Notice of Pesticide Registration for Graduate A+ (EPA Registration No. 100-1308, Issuance Date: Apr. 17, 2009).
Loukas Kanetis et al., "Comparative Efficacy of the New Postharvest Fungicides Azoxystrobin, Fludioxonil, and Pyrimethanil for Managing Citrus Green Mold", Plant Disease, Nov. 1, 2007, pp. 1502-1511, vol. 91, No. 11, XP055037856.
WIPO; App. No. PCT/EP2022/083689; International Search Report and Written Opinion mailed Mar. 1, 2023; pp. 1-16.
Peters, Rick; "Post-harvest management of silver scurf and Fusarium dry rot of potatoes in storage with azoxystrobin and fludioxonil"; Agriculture and Agri-Food Canada (AAFC); date modified Oct. 12, 2018; pp. 1-5.
Syngenta Crop Protection, supplemental potato spray treatment data.
PRIA Label Amendment Adding post harvest use for sugar beet Product Name Graduate A.†
Label Amendment Add Potato Tuberous and Corm Vegetables Subgroup 1C.†
L. Cerioni et al Use of Phosphite Salts in Laboratory and Semi commercial Tests to Control Citrus Postharvest Decay Plant disease.†

* cited by examiner
† cited by third party

*Primary Examiner* — Brian-Yong S Kwon
*Assistant Examiner* — Danielle Kim
(74) *Attorney, Agent, or Firm* — BakerHostetler; Toni-Junell Herbert

(57) ABSTRACT

Methods of post-harvest protection by spraying a harvested crop of sugar beets, potatoes, or corm vegetables with a composition comprising fludioxonil and azoxystrobin, wherein the only active ingredients in the composition fludioxonil and azoxystrobin.

11 Claims, No Drawings

POST-HARVEST FUNGICIDAL USES

TECHNICAL FIELD

This disclosure relates to methods of post-harvest protection of crops using fungicides. In particular, post-harvest protection of sugar beets, potatoes, or corm vegetables. In more specific embodiments, the post-harvest protection uses fludioxonil and azoxystrobin.

BACKGROUND

Based on estimates from the United States Department of Agriculture, about 7.5 percent of potato loss occurs during storage. Individual farm loss can be more severe, with entire storages lost at times. While normal transpiration and respiration cause some potato weight loss, the more serious cause is often storage diseases. Generally, storage diseases cannot be cured, but the spread of pathogens can be limited so that healthy potatoes are protected. Accordingly, there remains a need for methods of protecting sugar beets, potatoes, or corm vegetables during storage.

Moreover, fungal isolates which acquire resistance to specific groups of fungicides can eventually dominate the fungal population if the same group of fungicides are used repeatedly or in successive years as the primary method of control for targeted species. This can result in partial or total loss of control of those species. Such resistance can be acquired by fungal species when application rates of fungicides are too low, allowing resistant populations to develop. Accordingly, there remains a need for fungicidal products with high loadings of fungicide to prevent development of resistance.

SUMMARY

Embodiments include a method of post-harvest protection by spraying a harvested crop of sugar beets, potatoes, or corm vegetables with a composition comprising fludioxonil and azoxystrobin, wherein the only active ingredients in the composition are fludioxonil and azoxystrobin.

Other embodiments include a method of post-harvest protection by spraying a harvested crop of sugar beets, potatoes, or corm vegetables with a composition consisting essentially of fludioxonil and azoxystrobin.

In still other embodiments, there is included a method of post-harvest protection by spraying a harvested crop of sugar beets, potatoes, or corm vegetables with a composition comprising fludioxonil and azoxystrobin, and without difenoconazole.

DETAILED DESCRIPTION

Before certain embodiments are described in greater detail, it is to be understood that this disclosure is not limited to certain embodiments described, as such may, of course, vary. It is also to be understood that the terminology used herein is for the purpose of describing certain embodiments only, and is not intended to be limiting, since the scope of the present disclosure will be limited only by the appended claims.

Described herein are several definitions. Such definitions are meant to encompass grammatical equivalents.

The use of "or" means "and/or" unless stated otherwise. Furthermore, the use of the terms "comprising," "having," "including," as well as other forms, such as "includes" and "included," are intended to be inclusive and mean that there may be additional elements other than the listed elements.

As used herein, the term "about" when referring to a measurable value such as an amount, a temporal duration, and the like, is meant to encompass variations. Such variations, however, are dependent on the specific component referred to and the context as understood by a person of ordinary skill in the art.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, representative illustrative methods, and materials are now described.

Each of the individual embodiments described and illustrated herein has discrete components and features which may be readily separated from or combined with the features of any of the other several embodiments without departing from the scope or spirit of the present disclosure. Any recited method can be carried out in the order of events recited or in any other order which is logically possible.

Currently, there are few compositions approved for managing post-harvest fungal diseases on sugar beets, potatoes, or corm vegetables. The current market standard for such disease management is Stadium® fungicide (by Syngenta) which contains azoxystrobin (Group 11), fludioxonil (Group 12), and difenoconazole (Group 3). Stadium® can be applied post-harvest to control Silver Scurf *Fusarium* and Dry Rot in tuberous and corm vegetables and potatoes. However, it has now been discovered that unexpectedly higher residues of azoxystrobin and fludioxonil are achieved when difenoconazole is removed. These higher residues can make up for the loss of efficacy in the absence of difenoconazole and allow for greater flexibility in disease resistance management.

While Graduate® A+ (azoxystrobin and fludioxonil composition) (by Syngenta) has been approved for use in the U.S. since Apr. 17, 2009, the approved use has been limited to post-harvest treatment of citrus, and control of Blue mold (*Penicillium* spp.), Diplodia stem-end rot (*Lasiodiploidia theobromae*), Gray mold (*Botrytis cinerea*), and Green mold (*Penicillium* spp.). Use of Graduate® A+ in sugar beets, potato, and tuberous and corm vegetables, was applied for on Jul. 20, 2021, and accepted by the EPA on Oct. 26, 2021.

Compositions

As used herein, the term "active ingredient" refers to an agrochemical active ingredient as understood by a person of ordinary skill in the art. Examples include compounds or ingredients registered has being biologically active against an agricultural pest. In general, agrochemical active ingredients include compounds listed The Pesticide Manual, 12th edition, 2001, British Crop Protection Council.

Compositions of the disclosure are not particularly limited. While in preferred embodiments the composition takes the form of a flowable suspension concentrate, other forms are possible. For example, compositions of the disclosure can be, or can be combined, with: wettable powders; wettable granules (dry flowables); liquid flowables; liquids; and emulsifiable concentrates.

In general, the amount of total active ingredients in the formulation can be between about 10 to 90% w/w, in other embodiments from about 20 to 80% w/w, or even from about 30 to 60% w/w. In some embodiments, the amount of total active ingredient is about 40% w/w. In specific embodiments, the amount of total active ingredient is 41.2% w/w. In some embodiments, the composition can fludioxonil in about 5 to 50% w/w, about 10 to 45% w/w, about 15 to 40%, about 20 to 35% w/w, about 25% w/w, or even about 30% w/w. In some embodiments, the composition can azoxystrobin in about 5 to 50% w/w, about 10 to 45% w/w, about 15 to 40%, about 20 to 35% w/w, about 25% w/w, or even about 30% w/w. In alternative embodiments, the compositions can have at least about 5% w/w, at least about 10% w/w, at least about 15% w/w, at least about 20% w/w, at least about 25% w/w, or at least about 30% w/w of either one of fludioxonil or azoxystrobin.

Embodiments of the disclosure include mixing a composition having fludioxonil and a composition having azoxystrobin to form a composition having fludioxonil and azoxystrobin.

The compositions disclosed can be diluted prior to use. Concentrations of active ingredients after dilution can vary depending on the specific post-harvest use. In some embodiments, the compositions can be diluted with about 0.25 to 2 gallons of water/carrier per ton of crop being treated are diluted with about 0.5 gallons of water/carrier per ton of crop being treated. In general, the composition can be diluted to about 0.6 to 1.0 fl oz/2,000 lb of harvested crop. More specifically, the compositions can be diluted to about 0.6 fl oz/2,000 lb of roots (e.g., sugar beets), or about 0.6 to 1.0 fl oz/2,000 lb of tubers (e.g., potato and tuberous and corm vegetables).

In some embodiments, the dilution can be based on the total amount of active ingredient per amount of post-harvest crop. For example, the maximum application rate per application of fludioxonil or azoxystrobin can be about 0.009 to 0.015 lb ai/2,000 lb. For instance, the maximum application rate per application of fludioxonil can be about 0.009 lb ai/2,000 lb of roots (e.g., sugar beets) or about 0.009 to 0.015 lb ai/2,000 lb of tubers (e.g., potato and tuberous and corm vegetables). The maximum application rate per application of azoxystrobin can be about 0.009 lb ai/2,000 lb of roots (e.g., sugar beets) or about 0.009 to 0.015 lb ai/2,000 lb of tubers (e.g., potato and tuberous and corm vegetables).

In general, specific embodiments include compositions having fludioxonil and azoxystrobin. Fludioxonil and azoxystrobin can be included in various ratios. For example, the ratio of fludioxonil and azoxystrobin can be from about 1:10 to 10:1, in some embodiments from about 1:5 to 5:1, or even about 1:2 to 2:1. In preferred embodiments the ratio of fludioxonil and azoxystrobin is about 1:1, and in more specific embodiments, the ratio is 1:1.

Fludioxonil,

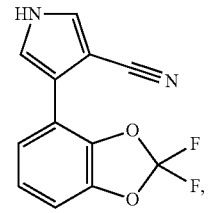 [SMILES: N#Cc1c[nH]cc1-c1cccc2c1OC(F)(F)O2]

is in the phenyl pyrrole group of fungicides, and has a mode of action involving interaction with a MAP/Histidine kinase that leads to disruption of osmotic signal transduction (Group 12 Fungicide).

Azoxystrobin,

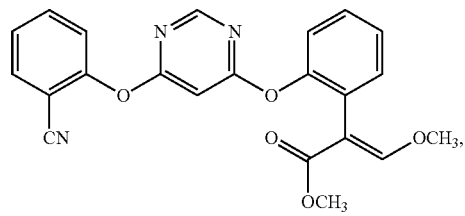 [SMILES: CO/C=C(/C(=O)OC)c1ccccc1Oc1cc(Oc2ccccc2C#N)ncn1]

is in the strobilurin class of chemistry and its mode of action is inhibition of the Qo (quinone outside) site in the mitochondrial electron transport system (Group 11 Fungicide).

In certain embodiments, the composition further includes at least one additional fungicide. Examples of additional fungicides include phosphorous acid salts and/or thiabendazole.

Phosphorous acid salts are salts of phosphorous acid ($H_3PO_3$). Specific examples of Phosphorous acid salts include mono- and dibasic sodium, potassium, and ammonium phosphites. Phosphorous acid salts can be any one, or a combination, of these salts.

Thiabendazole,

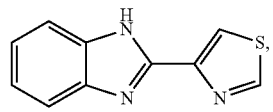 [SMILES: c1ccc2[nH]c(-c3cscn3)nc2c1]

is a Group 1 fungicide. Thiabendazole belongs to the methylbenzimidazole carbamate class of chemistry which disrupts ß-tubuline assembly in mitosis.

Embodiments include compositions which comprise fludioxonil and azoxystrobin, but do not include difenoconazole. Difenoconazole,

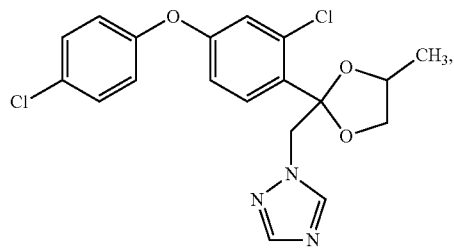 [SMILES: CC1COC(Cn2cncn2)(c2ccc(Oc3ccc(Cl)cc3)cc2Cl)O1]

is a triazole fungicide in Group 3. In general, difenoconazole is taken up by plants and acts on the fungal pathogen during penetration and haustoria formation. It stops development of the fungi by interfering with the biosynthesis of sterols in cell membranes.

In specific embodiments, compositions as described herein include fludioxonil and azoxystrobin as the only active ingredients. In other embodiments, the compositions consist essentially of fludioxonil and azoxystrobin. In some embodiments, the compositions consist of fludioxonil, azoxystrobin, and a carrier.

Application and Related Methods

The application of the disclosed compositions to the post-harvest crops is primarily done by spray application. The application equipment should be properly maintained and calibrated using appropriate carriers or surrogates. Preferred application equipment includes hydraulic nozzle, controlled droplet applicators, and similar application systems.

Certain embodiments allow for application of the composition to be done on an Table Application. In such embodiments, if space allows, a roller-application table or roller-toll-booth-spreading system can be used for application. The application table can be positioned just after a final sorting tables. Shielding can be added to reduce exposure close to the sorting workers, and rollers can be added to ensure that tubers are rotating during application. If the crops are in a single layer, a roller table is appropriate. However, if the tubers are typically 2-deep or more, a spreading, or toll-booth, system may be required to reduce their depth to a single layer. Nozzles can be positioned above the line to spray down onto the rotating tubers.

In other embodiments, application of the composition can be done through drop point application. In general, if space or other considerations to do not allow for a roller table application, a drop-point application can be used. The spray is applied to the crops as they fall from one conveyor to another, or off the end of the piler. The drop point is drop-point can be selected where crops fall in a single layer, and where nozzles can be positioned for best coverage. For high tonnage operations, where falling rops remain in multi-layers, nozzles can be positioned both above and below the falling tubers. If conveyor to conveyor drop points are shielded, or where tubers "flow" from one conveyor to another, then the only choice may be to position the sprayer at the end of the piler. This is not ideal as, A) It will be difficult to inspect, clean and maintain such a system, and B) The risk of pile contamination or over application in case of breakage or a system blow-out.

During the application process, steps should be taken to ensure proper coverage based on the application.

In one embodiment, the method of applying the composition includes various steps. For example: (1) cleaning spray equipment before using the composition; (2) shaking the composition container before mixing; (3) preparing no more spray mixture than is required for the immediate operation; (4) vigorously agitating the composition; (5) maintaining maximum agitation throughout the spraying operation; (6) not letting the spray mixture stand overnight in the spray tank; and (7) flushing the spray equipment thoroughly following each use.

In another embodiment, methods of applying the compositions can include the following steps, for example: (1) adding ½ of the required amount of water or wax/oil emulsion (or aqueous dilution of a wax/oil emulsion) to a spray or mixing tank; (2) with the agitator running, opening the container to add the composition to the tank; (3) agitating while adding the remainder of the carrier; (4) applying the solution after the composition has completely and uniformly dispersed into the mix carrier; (5) agitating until all of the mixture has been applied.

Embodiments of the disclosure include, for example: (1) adding ½ of the required amount of water or wax/oil emulsion (or aqueous dilution of a wax/oil emulsion) to the spray or mixing tank; (2) with the agitator running, adding the composition of the disclosure to the tank; (3) agitating while adding the remainder of the carrier; (4) after the composition has completely and uniformly dispersed into the mix carrier, adding tank mix partners in the following order unless label directions or other consideration indicate otherwise:
  a) wettable powders
  b) wettable granules (dry flowables)
  c) liquid flowables
  d) liquids
  e) emulsifiable concentrates.
(5) allowing each tank mix partner to become fully dispersed before adding the next product; and
(6) agitating to maintain a uniform suspension until all of the spray solution has been applied.

Certain embodiments include conducting compatibility testing using a jar test. This can include using a 1 pt to 1 qt container with lid, and adding water or other intended carrier such a liquid fertilizer to the jar. Next, adding the appropriate amount of pesticides(s) or tank-mix partner(s) in their relative proportions based on specified label rates. Adding tank-mix components separately. After each addition, shake or stir gently to thoroughly mix. After all ingredients have been added, put the lid on the jar, tighten, and invert the jar 10 times to mix. After mixing, let the mixture stand 15-30 minutes and then examine for signs of incompatibility such as obvious separation, large flakes, precipitates, gels, or heavy oily film on the jar. If the mixture remains mixed or can be remixed readily, it is physically compatible and can be used. If the mixture is incompatible, repeat the test using a compatibility agent at the specified label rate. Or, if applicable, slurry dry formulations in water before adding to the jar. If incompatibility is still observed after following these procedures, do not use the mixture. After compatibility testing is complete, dispose of any pesticide wastes.

In preferred embodiments, the sugar beets, potatoes, and tuberous and corm vegetables, are tumbled during application.

Embodiments of the disclosure can be integrated into an overall disease and pest management strategy (IPM) whenever the use of a fungicide is required. To manage disease, applicators can consult disease forecasting programs, which recommend application timing based on environmental factors favorable for disease development.

In some embodiments, post-harvest application is limited to a single application. Certain embodiments limit the amount of active compound applied during application to 0.0093 lb of fludioxonil per 2,000 lb of roots, for example, when the post-harvest crop is sugar beets. In other embodiments, the amount of active compound applied during application to 0.0093 lb of azoxystrobin per 2,000 lb of roots, for example, when the post-harvest crop is sugar beets. Certain embodiments limit the amount of active compound applied during application to 0.015 lb of fludioxonil per 2,000 lb of tubers, for example, when the post-harvest crop is potatoes and tuberous and corm vegetables. In other embodiments, the amount of active compound applied during application to 0.015 lb of azoxystrobin per 2,000 lb of tubers, for example, when the post-harvest crop is potatoes and tuberous and corm vegetables.

The final amount of active ingredient residue on the harvested crop can vary depending on the active ingredient and crop. For example, the active ingredient residue of each individual active ingredient can be less than about 40 mg/kg, less than about 20 mg/kg, or less than about 15 mg/kg. In some embodiments, active ingredient residue of each individual active ingredient on the harvested crop can be less than 8 mg/kg (for example in yams). In other embodiments, active ingredient residue of each individual active ingredient on the harvested crop can be less than 3.5 mg/kg (for example in tuberous and corm vegetables). In other embodiments, the active ingredient residue of each individual active ingredient can be as low as less than 1 mg/kg (for example in potatoes).

In order to achieve specific residue amounts, harvested crops can be cleaned after applying of the composition. Cleaning can be done after bulk storage of the harvested crop is completed.

In general, application is done to control or limit the spread of phytopathogenic diseases, and in particular fungi. This can include identifying that a harvested crop is infected or under threat of infection. Notable phytopathogenic diseases include *Helminthosporium solani*, *Fusarium* spp., *Rhizopus stolonifera*, *Ceratocystis fimbriata*, and *Phytophthora infestans* in potatoes or corm vegetables, and *Fusarium* spp., *Botrytis* spp., *Penicillium* spp., and *Rhizoctonia* spp. in sugar beets. Potatoes or corm vegetables include arracacha; arrowroot; artichoke, Chinese; artichoke, Jerusalem; canna, edible; cassava, bitter and sweet; chayote (root); chufa; dasheen (taro); ginger; leren; potato; sweet potato; tanier; turmeric; yam bean; and yam, true.

Example 1

Graduate® A+ (azoxystrobin and fludioxonil composition) was obtained from Syngenta. The formulation was tested in an inline spray at 1.0 fl oz/ton in potatoes on a table. Graduate® A+ contains 20.6 w/w % azoxystrobin and fludioxonil, each, and uses 1.99 lbs/gal of azoxystrobin and fludioxonil each. These results were compared to the current industry standard Stadium® (azoxystrobin, fludioxonil, and difenoconazole composition) which was applied in a similar manner in an inline spray at 1.0 fl oz/ton in potatoes infected with Silver Scurf or Dry Rot. Stadium® contains 9.76 w/w % difenoconazole, 12.51 w/w % azoxystrobin, and 12.51 w/w % fludioxonil, and uses 1.197 lbs/gal each, of azoxystrobin and fludioxonil. The results are provided below.

| Silver Scurf (*Helminthosporium solani*) analysis - Residues (ppm) | | | |
|---|---|---|---|
| Active Ingredient | Untreated | Stadium ® | Graduate ® A+ |
| azoxystrobin | <LOQ | 0.545 | 1.29 |
| difenoconazole | <LOQ | 0.746 | <LOQ |
| fludioxonil | <LOQ | 0.728 | 1.4 |

* <LOQ - limit of quantification = 0.01 ppm

| Dry Rot analysis - Residues (ppm) | | | |
|---|---|---|---|
| Active Ingredient | Untreated | Stadium ® | Graduate ® A+ |
| azoxystrobin | <LOQ | 1.04 | 2.42 |
| difenoconazole | <LOQ | 1.16 | <LOQ |
| fludioxonil | <LOQ | 1.23 | 2.34 |

* <LOQ - limit of quantification = 0.01 ppm

Residues of azoxystrobin and fludioxonil from Graduate® A+ were surprisingly high as compared to Stadium®. In particular, residues of azoxystrobin and fludioxonil were nearly twice as high from Graduate® A+ over Stadium® despite there being less than twice the amount of active ingredient in formulation.

Example 2

Graduate® A+ was obtained from Syngenta and combined with Phostrol® (phosphorous acid salts 53.6 w/w % (6.69 lbs/gal)) or Mertect®340-F (thiabendazole at 42.3% w/w (4.1 lbs/gal)). The formulations were tested in an inline spray at 1.0 fl oz/ton of Graduate® A+ with 0.42 fl oz/ton of Mertect®340-F and 12.8 fl oz/ton of Phostrol® in potatoes on a table. The results are provided below.

| Silver Scurf (*Helminthosporium solani*) analysis - Residues (ppm) | | | |
|---|---|---|---|
| Active Ingredient | Graduate ® A+ | w/ Phostrol ® | w/Mertect ®-340F |
| azoxystrobin | 1.29 | 0.705 | 0.952 |
| fludioxonil | 1.4 | 0.958 | 1.11 |

* <LOQ - limit of quantification = 0.01 ppm

| Dry Rot analysis - Residues (ppm) | | | |
|---|---|---|---|
| Active Ingredient | Graduate ® A+ | w/ Phostrol ® | w/ Mertect ®-340F |
| azoxystrobin | 2.42 | 1.64 | 1.78 |
| fludioxonil | 2.34 | 1.81 | 1.97 |

* <LOQ - limit of quantification = 0.01 ppm

The invention claimed is:

1. A method of post-harvest protection, comprising: spraying a harvested crop of potatoes with a composition comprising fludioxonil and azoxystrobin, wherein the only active ingredients in the composition are fludioxonil and azoxystrobin, and the spraying is at 0.015 lb ai azoxystrobin/2,000 lb of the potatoes and 0.015 lb ai fludioxonil/2,000 lb of the potatoes.

2. The method of claim 1, wherein the harvested crop is infected or under threat of infection from at least one of *Helminthosporium solani*, *Fusarium* spp., *Rhizopus stolonifera*, *Ceratocystis fimbriata*, and *Phytophthora infestans*.

3. The method of claim 1, further comprising tumbling the harvested crop during the applying.

4. The method of claim 2, wherein the composition is diluted prior to the spraying.

5. The method of claim 1, wherein the spraying is by hydraulic nozzle, controlled droplet applicator, or similar application system.

6. The method of claim 1, further comprising adding half of the required amount of water or wax/oil emulsion or aqueous dilution of a wax/oil emulsion for the composition to a spray or a mixing tank.

7. The method of claim 1, further comprising running an agitator in the spray or the mixing tank; and adding the composition to the spray or the mixing tank prior to the spraying.

8. A method of post-harvest protection, comprising:

spraying a harvested crop of potatoes with a composition consisting essentially of fludioxonil and azoxystrobin, and the spraying is at 0.015 lb ai azoxystrobin/2,000 lb of the potatoes and 0.015 lb ai fludioxonil/2,000 lb of the potatoes.

9. The method of claim 8, wherein the composition further comprises phosphorous acid salts and/or thiabendazole.

10. A method of post-harvest protection, comprising:

spraying a harvested crop of potatoes with a composition comprising fludioxonil and azoxystrobin, and without difenoconazole, and the spraying is at 0.015 lb ai azoxystrobin/2,000 lb of the potatoes and 0.015 lb ai fludioxonil/2,000 lb of the potatoes.

11. The method of claim 10, wherein the composition further comprises phosphorous acid salts and/or thiabendazole.

* * * * *